UNITED STATES PATENT OFFICE.

EBENEZER WILLIS, OF AYER, MASSACHUSETTS.

IMPROVEMENT IN CEMENTS.

Specification forming part of Letters Patent No. 205,598, dated July 2, 1878; application filed December 7, 1877.

*To all whom it may concern:*

Be it known that I, EBENEZER WILLIS, of Ayer, in the county of Middlesex and State of Massachusetts, have invented a certain Improved Cement, to be used for covering wood to protect it, for forming or constructing any articles in which a very strong and permanent cement is required, or for use in any place where such a strong and permanent cement can be employed.

This cement consists of a composition formed by mixing iron-filings, iron-turnings, or any fine particles of iron with some substance which shall hold them temporarily in position while the iron particles are being acted upon by some mild acid, or by any fluid or substance which will rust or oxidize the particles of iron, the strength of the cement, after having time to fully set, depending on the rust or oxidation of the particles of iron.

A very good way to prepare this cement is to take three parts of iron filing, borings, turnings, or chips, one part common clay, two parts common brick-mortar, dried and then made fine again. Mix these thoroughly together, and then add two parts calcined plaster and mix again thoroughly. Then take any given quantity of water and dissolve in it as much alum as the water will absorb. Wet the mass, consisting of parts as above described, with this solution until the mass forms a very thin paste. Mix in small quantities and spread immediately. It will very soon set so as to hold its position, and the alum-water will act on the iron particles, causing them to rust or oxidize. This oxidation of the particles of iron will gradually strengthen and harden the mass, forming in time a very hard, permanent, and almost indestructible cement, which will be but slightly affected by heat and cold, having but very little or no expansion and contraction under change of temperature.

It is not essential that just these proportions of the parts named should be employed, nor that the cement for holding the particles of iron temporarily in position should consist exactly of the substances named; but it is essential that particles of iron should be mixed with some substance to hold them temporarily in position, and that the particles of iron should be acted upon by some substance which will rust or oxidize them to give firmness and durability to the cement.

I claim as my invention—

The cement consisting of particles of iron in combination with plaster, clay, or some like substance, to hold them temporarily in position, and some mild acid to cause oxidation of the particles of iron, by means of which oxidation the cement shall become hardened and solidified without the action of fire or heat, substantially as described.

EBENEZER WILLIS.

Witnesses:
 EDWIN A. HILDRETH,
 GEORGE E. BURT.